United States Patent [19]
Nguyen et al.

[11] Patent Number: 4,797,582
[45] Date of Patent: Jan. 10, 1989

[54] BIDIRECTIONAL INTERFACE CIRCUIT HAVING A UNIPOLAR PORT AND A BIPOLAR PORT FOR LOGIC SIGNALS

[75] Inventors: Van T. Nguyen; Claude Chateignon, both of Toulouse; Georges Deschamps, Montreuil sous Bois, all of France

[73] Assignee: Bendix Electronics S.A., Toulouse, France

[21] Appl. No.: 49,868

[22] Filed: May 13, 1987

[30] Foreign Application Priority Data

May 14, 1986 [FR] France ................... 86 06936

[51] Int. Cl.⁴ .................. H03K 19/092; H03K 17/16; H03K 17/56
[52] U.S. Cl. ..................................... 307/475; 307/443; 307/473; 307/243
[58] Field of Search ................. 307/443, 473, 475, 243

[56] References Cited

U.S. PATENT DOCUMENTS 4,608,504 8/1986 Yanamoto ........................... 307/473
4,695,740 9/1987 Carter ................................. 307/475

FOREIGN PATENT DOCUMENTS

EPA150457 1/1984 Fed. Rep. of Germany .
EPA171555 7/1984 Fed. Rep. of Germany .

OTHER PUBLICATIONS

IEEE Transactions on Consumer Electronics, vol. CE14 27, No. 1, Feb. 1981, pp. 102-116, IEEE, New York.
Electronic Engineering, vol. 56, No. 689, May 1984, pp. 97-99, London, GB.

Primary Examiner—William L. Sikes
Assistant Examiner—M. R. Wambach
Attorney, Agent, or Firm—Russel C. Wells; Markell Seitzman

[57] ABSTRACT

The invention relates to the transmission of logic signals.

The circuit comprises a port D connected to a line for the transmission of unipolar logic signals and a port (D+, D−) connected to a pair of wires for the transmission of differential logic signals. Current generators (T4, T5) send a positive differential signal when a unipolar "low" logic signal is applied to port D. when the differential signal received at (D+, D−) must be transmitted on the D port by a "low" level, the signal representing the low level remains higher than the voltage level $V_{L1}$ below which the voltage generators are activated, in order to prevent any blockage of the circuit by looping of the signals within the circuit.

Application to the multiplexing of the flow of data processed in an automobile vehicle.

8 Claims, 2 Drawing Sheets

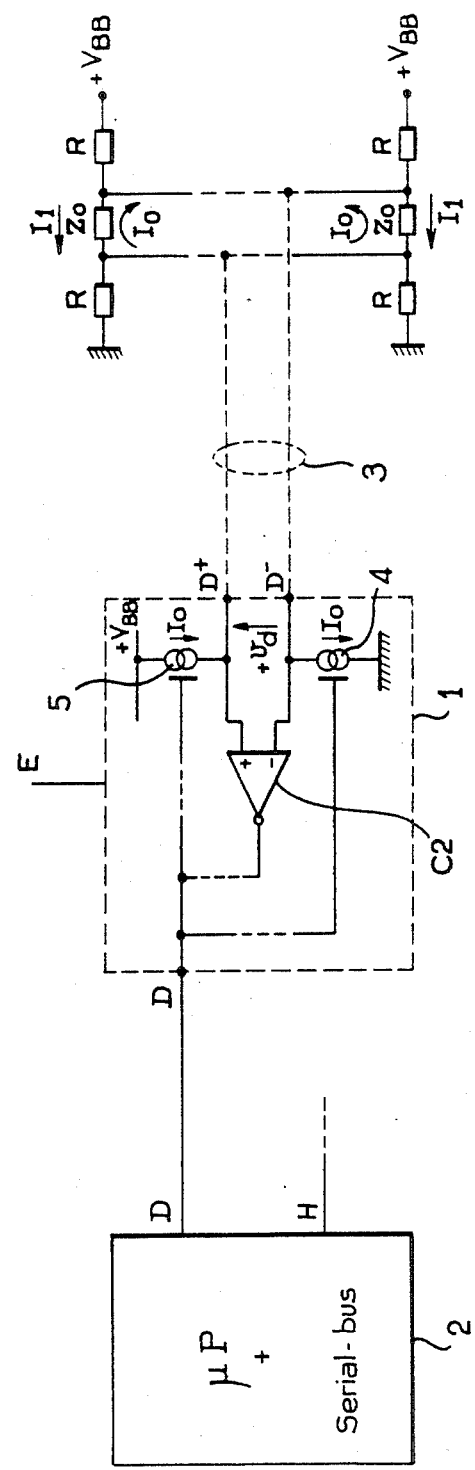
FIG_1

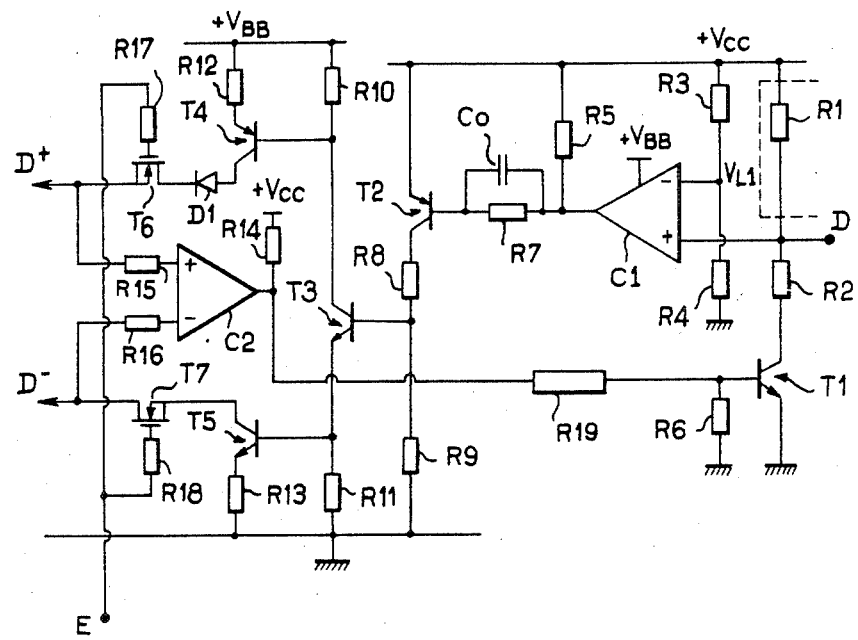
FIG_2

BIDIRECTIONAL INTERFACE CIRCUIT HAVING A UNIPOLAR PORT AND A BIPOLAR PORT FOR LOGIC SIGNALS

The present invention relates to a bidirectional interface circuit and, more particularly, to such a circuit for exchanging logic signals between a port connected to a wire for the transmission of serial unipolar signals and a second port connected to a pair of wires for the transmission of differential (or bipolar) serial signals.

Certain industrial applications make use of a data transmission system that is well known in remote data processing under the name "multiplexing". For example the high and ever-increasing number of sensors and activators installed in an automobile vehicle, leads to the loading of the vehicle with dense, complicated and bulky electrical cable systems which have a large cumulative length. This results in more difficult fault location and increased difficulty in providing passage for these cables through the structure of the vehicle. It is also necessary to add new cables in order to install a particular optional equipment in the vehicle. Multiplexing, applied to the distribution of signals normally transmitted by the traditional cables, enables a considerable reduction in the length of cable installed in the vehicle.

For such a vehicle, this multiplexing can be designed using a local multipoint and multi-master system comprising several electronic units which communicate with each other over a transmission medium. A mode of transmission which is simple to implement and, consequently, economical is base band transmission. Base band transmission, which does not use a carrier, allows only a single transmitter to send its message on line at a given time, in order to avoid conflicts and loss of data.

A microcomputer receives and processes the signals flowing on line by means of an interface called a "serial bus" interface. The interface must be "multi-master", so that several local stations can take control of it. An arbitration procedure enables the putting out of service of the output stage of a master which is transmitting, for example, a "high" logic level on the line while another master is transmitting a "low" level. The latter master than takes control of the line. In the quoted example, it is said that there is "low" state priority.

Such serial busses are commercially available. In particular, the interface called "I²C bus" marketed by the Philips Company is known. The I²C bus is a bidirectional serial bus comprising a data line and a clock line. It is also a multi-master interface with low state priority arbitration. As all the masters transmit their own clock signal, it is necessary during an arbitration phase to transmit a common clock produced by synchronization of the clocks of the arbitrated masters. Finally it should be noted that the data or clock signals transmitted by the I²C bus are of unipolar type, the range of the signals being several meters.

In this respect, in the application of multiplexing with local system for automobile vehicles envisaged above, a pair of non-twisted wires are preferred to be used as a transmission medium for reasons of manufacturing cost, with signals applied in differential mode for reasons of noise immunity. In this application, the range of the transmission line with signals applied in differential mode must be several tens of meters. Consequently, if it is wished to retain the advantageous features of a serial bus of I²C type in the envisaged application, it is also necessary to have a transmission line interface matched to a unipolar link on the bus side, and to a differential link on the transmission line side.

Such interfaces (or line "drivers") are commercially available. However these interfaces only work in a single direction, it is necessary to connect two such interfaces "head-to-tail" in order to obtain a bidirectional link. It is also noted that in that case transmission is only carried out in "half-duplex", i.e. sometimes in one direction and at other times in the other direction, using two control wires acting on one or other of the interfaces thus connected. In fact, if both interfaces are simultaneously enabled, the signals are looped because of the head-to-tail connection of the interfaces, and these interfaces are blocked.

An object of the present invention is therefore to produce a bidirectional interface circuit capable of transmitting data in both directions, without blockage of the circuit and without using transmission direction control wires.

Another object of the present invention is to produce such a circuit which enables the acquisition of a transmission line by a master transmitting a signal of a first logic state, in the case of conflict with another master transmitting a signal of a second logic state, by an arbitration procedure between these two masters.

These two objects of the invention are achieved with an interface circuit for exchanging logic signals between a port connected to a wire for the transmission of unipolar serial signals and a second port connected to a pair of wires for the transmission of differential serial signals, which comprises means of transmitting on the unipolar port a first signal of a first logic state of an electrical level different from that of a second signal of the same logic state applied to that port for transmission on the differential port, and means sensitive to this difference in electrical levels in order to prevent the looping of the first signal through the circuit from blocking the circuit.

This circuit also includes means of establishing on each port a priority of the first logic state over the second state, in the case of a conflict of signals, in both directions of flow of these signals.

In the accompanying drawings, given by way of example only:

FIG. 1 is a block diagram showing a transmission link between a microprocessor equipped with a serial bus and a transmission line, by means of the interface circuit according to the present invention; and FIG. 2 is a wiring diagram of the interface circuit according to the invention.

Reference is now made to FIG. 1, in which the interface circuit 1 according to the invention is connected through its unipolar port D to the data transmission line of the serial bus of a microprocessor 2. The circuit 1 also has a differential port (D+,D−) connected to the wires of a transmission line 3.

In the case of the abovementioned I²C serial bus or of any other bus of the same type, there is also a clock signal line H which communicates with a two-wire clock line (H+, H−, not shown) by means of an interface which is completely identical with that formed by circuit 1. The functioning of the circuit is identical in both cases and consequently this functioning will only be described in the case of processing the data signals, by way of examples. The line (D,D+,D−) and (H,H+,H−) have the same electrical and functional features.

Returning to FIG. 1, it can be seen that the interface circuit 1 includes two current generators 4 and 5. Generator 4 is connected between the D− port of the differential line 3 and ground while generator 5 is connected between a voltage source +$V_{BB}$ and the D+ port of the differential line 3. These two generators are controlled by the signals coming from the D port of circuit 1. The circuit also includes a comparator C2 whose output is inverted while the positive and negative inputs of this comparator are connected to the differential ports D+ and D− respectively.

The transmission line is itself powered by a voltage source +$V_{BB}$ and loaded by an impedance $Z_o$ inserted between two resistors R placed in series with $Z_o$ between the source +$V_{BB}$ and ground (current $I_1$).

The interface circuit according to the invention is designed in such a way that an electrical signal at "low" level (electrical level $V_{b1}$ less than or equal to a predetermined value $V_{L1}$) applied at D commands the activation of the current generators 4 and 5 and thus produces a current $I_o$ which flows through the differential line from the point D+ to the point D− in such a way that a potential difference $(V_{D+} - V_{D-}) = +V_d$ appears.

On the other hand, a signal at "high" level (electrical level greater than or equal to a predetermined value $V_h$) applied at D puts generators 4 and 5 into the rest state and makes a potential difference −$V_d$ appear at the terminals of the differential line. It is clear that the high and low logic level signals applied to the D port result, on the differential port of the circuit according to the invention, in negative −$V_d$ or positive +$V_d$ potential differences respectively, which represent these logic levels. Conversely, a potential difference applied to the terminals (D+, D−) such that $V_{D+} - V_{D-} = +V_d$ puts the line D in the low state (electrical level $V_{b2}$ supplied by comparator C2 with an inverted output). Similarly a potential difference $(V_{D+} - V_{d-}) = -V_D$ applied to the terminals D+, D− puts the line in the high state (electrical level greater than or equal to $V_h$).

In addition, in order to comply with the transmission procedure of the abovementioned I²C bus or any other equivalent bus, the interface circuit according to the invention must be designed in such a way that the low state takes priority over the high state.

It is then necessary to prevent the interface from becoming blocked in the low state when a low level signal is applied at D or when the circuit receives a signal +$V_d$ from the differential line. According to an important feature of the interface circuit of the invention, the electrical signal then transmitted at D by the comparator-inverter C2 is such that it has a voltage level, clearly lower than the voltage level $V_b$ necessary for representing a low logic state on the D line, but higher than the voltage level $V_{L1}$ below which the current generators 4 and 5 are put into operation. In this way there is avoidance of looping signals between the differential port and the unipolar port of the circuit according to the invention, and thus the blockage of this circuit.

The table below shows the voltage ranges available to the signals for transmission or reception by the microprocessor at D, to transmit or receive the two logic levels, "low" (0) and "high" (1) to the differential line or from the line.

| TRANSMISSION AT D ( ) | 0 | | | | 1 | | Volts |
|---|---|---|---|---|---|---|---|
| | 0 | $V_{L1}$ | $V_{L2}$ | $V_b$ | | $V_h$ | |
| RECEPTION AT D ( ) | | | | 0 | | 1 | |

In this table the voltages $V_h$ and $V_b$ represent the minimum and maximum voltages which can be applied to the D port in order to be read by the microprocessor as a 1 or as a 0 respectively, through the serial bus. In addition, this table shows another feature of the interface circuit according to the invention, a feature by which there is established an amplitude guard ($V_{L1} - V_{L2}$) between the 0 level on reception at D and the 0 level on transmission at D. This guard ensures certainty of distinction between these two levels.

Reference is now made to FIG. 2 which shows the circuit diagram of the interface circuit according to the invention. In general terms, this circuit comprises two sub-circuits. A first sub-circuit is used for receiving signals transmitted to the differential port (D+, D−), in order to be transmitted to the unipolar port D. This first sub-circuit basically comprises a comparator C2 forming a differential input stage and a transistor T1 forming the output stage. The second sub-circuit is fed with a signal received on the unipolar input D in order to be transmitted on the line through the differential port (D+, D−). This second sub-circuit is basically formed from transistors T4 and T5 connected as a current generator, transistors T2 and T3 used as control and biasing transistors respectively, and comparator C1 whose negative input is taken to a potential equal to $V_{L1}$.

The first sub-circuit will now be described in greater detail. The positive and negative inputs of the comparator C2 are connected to the D+ and D− lines respectively of the differential port of the interface circuit according to the invention. The output of the comparator C2 feeds, through a resistor 19, the base of the NPN type transistor T1. A voltage source +Vcc feeds resistors R14, R19 and R6 connected in series in order to suitably bias the base of transistor T1. The resistor R6 is itself connected between this base and ground. The transistor T1 is connected in open collector configuration between the bipolar port D of the interface circuit and ground. An external pull-up resistor R1 and a resistor R2 are connected in series between the voltage source +Vcc and the collector of T1 in order to establish a voltage division at the port D.

The second sub-circuit comprises the comparator C1 fed by a voltage source of +$V_{BB}$. The positive input of this comparator is connected to the unipolar port D while its negative input is connected to the midpoint of a bridge of resistors R3, R4 which serve to establish a voltage division between the current source +Vcc and ground, the mid point of this bridge enabling the abovementioned voltage level $V_{L1}$ to be adjusted.

The output of the comparator C1 controls the base of the PNP type transistor T2, through a resistor R7 across the terminals of which is connected a capacitor $C_0$. A resistor R5 is connected between the point common to the resistor R7 and to the output of the comparator C1 and the voltage source +Vcc. This transistor T2 controls the base of the NPN type biasing transistor T3 by means of the mid point of a bridge of resistors R8, R9 connected between the collector of transistor T2 and ground. The transistor T3 controls the turning off and turning on of the two transistors T4 and T5 connected as current generators. A resistor R10 is connected between the voltage source $+V_{BB}$ feeding the differential line and the point common to the base of transistor T4 and to the collector of transistor T3. Similarly, a resistor R11 is connected between ground and the point common to the emitter of transistor T3 and to the base of transistor T5. Transistors T4 and T5 are opposite types, PNP and NPN respectively. Transistor T4 is connected by its emitter to the voltage source $+V_{BB}$, by means of a resistor R12 while its collector is connected to the output D+ of the differential port, through an overvoltage protection diode D1. Transistor T5 is connected by its collector to the D— output of the differential port. The emitter of T5 is connected to ground through a resistor R13. A control wire E for disconnecting the differential line D+ and D— acts on these by means of field effect transistors T6 and T7, whose gates are loaded by resistors R17 and R18 respectively. The sending of an appropriate signal on this wire E enables the differential port to be put into the "high impedance" state.

According to an advantageous embodiment of the interface circuit of the invention, the resistors R12 and R13 are variable. In this way it is easy to adapt the differential voltage $(V_{D+}-V_{D-})$ to the noise level picked up on the differential line by changing the values of R12 and R13 and/or of the voltage $+V_{BB}$.

Reference is now made to both FIGS. 1 and 2 in order to explain the functioning of the interface circuit according to the present invention.

Let us first examine the case in which a logic "1" is sent by the microprocessor. A signal $V_D$ higher than $V_h$ is then applied to the unipolar port D. As this signal is higher than the voltage level $V_{L1}$ applied to the negative input of the comparator C1, the output of the comparator holds off the control transistor T2 which also causes the holding off of transistors T3, T4 and T5. The current generators T4 and T5 then being inactive, the current $I_o$ sent on line is zero. The differential voltage which propagates on the line is therefore equal to:

$$Vd(1) = (V_{D+} - V_{D-}) = -\frac{V_{BB} \times Z_o}{Z_o + 2R} < 0$$

This voltage signal is received by all the interfaces connected to the differential line, including the emitting interface circuit according to the invention. As this voltage is negative, transistor T1 is held off. The voltage at D therefore remains at the "high" level corresponding with the logic 1 emitted and observed by the serial bus of the microprocessor.

In order to send a logic level 0 on the differential line, an electrical signal of level lower than level $V_{L1}$ is applied at D. The output of the comparator C1 then saturates the transistor T2 which turns transistor T3 on, this latter transistor triggering the generation of current by transistors T4 and T5. This current $I_o$ can be calculated approximately from the following formula:

$$I_o \simeq \left[ \frac{(V_{cc} - V_{cesat})}{R8 + R9} \times R9 - 2V_{be} \right] = \frac{1}{R13}$$

In this formula, $V_{cesat}$ corresponds with the collector-emitter voltage drop at saturation in the transistor T2 and the factor $2V_{be}$ corresponds with the sum of the emitter-base voltage drops in transistors T3 and T5.

This current creates a positive potential difference equal to:

$$Vd(0) = (V_{D+} - V_{D-}) = \frac{Z_o R I_o}{Z_o + 2R} + Vd(1)$$

In this formula the factor $Vd(1)$ corresponds with the voltage observed on line Io=0.

The positive voltage $Vd(0)$ is found again at the input of the comparator C2 whose output causes the saturation of transistor T1. According to the invention, in order to avoid the blockage of the interface circuit, it is therefore necessary for the voltage at D to be higher than $V_{L1}$:

$$\frac{V_{cc} - V_{cesat}}{R1 + R2} R2 + V_{cesat} > V_{L1}$$

where $V_{cesat}$ is the collector-base voltage drop in the saturated transistor T1.

This value is arbitrarily set at a value $V_{L2}$, smaller than $V_b$. The ratio of the resistors R1 and R2 of the divider bridge whose mid point is connected to unipolar port D is taken from this value $V_{L2}$:

$$\frac{R1}{R2} = \frac{V_{cc} - V_{L2}}{V_{L2} - V_{cesat}}$$

Transistor T3 is biased to work in a linear zone (fast switching). Knowing the base potential of transistor T3, the ratio of the bias resistors R8 and R9 can be deduced.

$$\frac{R8}{R9} = \frac{V_{cc} - V_{BT3}}{V_{BT3}}$$

In this formula $V_{BT3}$ is the voltage on the base of transistor T3.

It was seen earlier that the interface circuit according to the invention should ensure, in the transmission of signals, a "low" state priority for reasons of compatibility with the transmission procedure of the serial bus connected to the microprocessor, when this serial bus is formed by the abovementioned I²C bus or by any other equivalent bus. Let us therefore examine what happens when the microprocessor emits a logic 1, which results in a voltage level on port D higher than the voltage level $V_h$. It follows that the voltage $(V_{D+}-V_{D-})$ on the differential port becomes negative. In this situation, if the differential line sends a logic 0 towards the microprocessor, the voltage $(V_{D+}-V_{D-})$ becomes positive, which causes the saturation of transistor T1 and a return of the potential at D to a value of $V_{b2}$ which is lower than the value of $V_b$. The serial bus of the microprocessor then sees a 0. It is clear that the 0 state has priority over the 1 state, as required by the adopted transmission procedure.

This "low" state priority is of course only mentioned by way of example and a specialist in the field could, without leaving the scope of the present invention, adapt the described interface circuit to a bidirectional transmission procedure with "high" state priority.

The following formulae enable the calculations to be made which give the values of certain components of the circuit according to the invention.

The various elements of the line load are such that we have:

$$Vd(0) = -Vd(1)$$

On the other hand, the impedance seen by the differential line is identical to the characteristic impedance $Z_c$ of the line which enables the interface circuit to be matched to thiS line. The value of $Z_c$ is obtained from the following formula:

$$Z_c = \frac{2 \cdot Z_o \cdot R}{Z_o + 2R} \text{ where } R = \frac{2V_{BB}}{I_o} \text{ and } Z_o \frac{2R}{2R - Z_c} \cdot Z_c$$

In the case of adapting the interface circuit according to the invention to the abovementioned I²C bus for which:

$V_b = 1.5$ v; $V_h = 3$ v; $V_{b1}$, level applied at D on emission $= 0.45$ v, the following can be chosen:

$V_{L1} = 0.75$ v; $V_{L2} = 1.15$ v.

The parts list of the various components of the circuit according to the invention, given solely by way of example, is given below:

| | |
|---|---|
| +Vcc = +5 v | |
| +V$_{BB}$ = +10 v | |
| C1,C2 | LM 219 |
| T1,T3 | 2N2 369 |
| T2 | 2N 5771 |
| T4 | BC 327 |
| T5 | BC 337 |
| T6,T7 | MOSFET MPF 6660 |
| R1 | 1k Ω |
| R3,R15,R16,R17,R18 | 10k Ω |
| R2 | 300 Ω |
| R4 | 1,8k Ω |
| R5,R8 | 620 Ω |
| R6 | 330 Ω |
| R7 | 3,3k Ω |
| R9 | 3,7k Ω |
| R10,R11 | 2k Ω |
| R12,R13 | 120 Ω |
| R14 | 620 Ω |
| R19 | 360 Ω |
| D | 1N 4148 |

The interface circuit according to the invention, in order to exchange in both directions logic signals, unipolar on one side and differential on the other, enables the avoidance of the abovementioned line "drivers" connected "head-to-tail", which cannot prevent a blockage without control by control wires. It also enables the establishment of a priority for the passing of signals of a certain logic state, according to the requirements of signal transmission procedures between a differential line and a processing unit such as a microprocessor, connected to a two-wire data line serial bus and a clock line.

The invention is not of course limited to the application described above relating to the multiplexing of signal transmission in a vehicle. On the contrary, it can be applied anywhere where it is important to provide bidirectional transmission of signals between a unipolar signals transmission line and a bipolar signals transmission line.

In addition, it is clear that the interface circuit according to the invention lends itself to embodiment as an integrated circuit.

We claim:

1. Interface circuit for exchanging logic signals between an unipolar port connected to a wire for the transmission of unipolar serial signals and a differential port connected to a pair of wires for the transmission of differential serial signals, characterized in that it comprises:

a first sub-circuit (C2,T1) for transmitting signals from the differential port to the unipolar port; said signals having a first and second logic state, said first logic state having a first level within a first range ($V_b - V_{L2}$);

a second sub-circuit (C1, T2, T3, T4, T5) for transmitting signals from the unipolar port to the differential port;

said signals having a second level within a second range ($V_{L1} - 0$) for transmission on the differential line of a signal ($+V_d$) representative of said first logic state, said first and second ranges having no common part; and means responsive to the non-overlapping of said first and second ranges to prevent the looping of said signals representative of said first logic state through the interface circuit from blocking the interface circuit.

2. Circuit according to claim 1, characterized in that it includes means of establishing on each port a priority of said first logic state over said second logic state, in the case of a conflict of signals, in both directions of flow of said signals.

3. Circuit according to claim 1, characterized in that said first and second sub-circuits being coupled at the point of said ports.

4. Circuit according to claim 1, characterized in that said second sub-circuit includes a threshold comparator (C1) having one input connected to a threshold voltage ($V_{L1}$) and another input connected to the unipolar port in order to control, by means of a control transistor (T2) and a biasing transistor (T3), current generators (T4,T5), for supplying a current to the differential port, for creating a positive differential signal under the control of a low logic signal arriving at the unipolar port, said threshold voltage $V_{L1}$ of said comparator (C1) corresponding to the limit potential that can be applied to the unipolar port in order to transmit on the differential port a positive signal, corresponding with a low logic level, an overshoot of said threshold voltage causing the blockage of said current generators and the transmission of a negative signal on the differential port, corresponding with a high logic level.

5. Circuit according to claim 1, characterized in that said first sub-circuit includes a comparator (C2) whose inputs are connected to the wires at the differential port and whose output controls the base of a transistor (T1) connected in open-collector configuration to the unipolar port and a bridge formed by an external resistor (R1) and a resistor (R2) fixing the voltage level of the low signal received by the unipolar port.

6. Circuit according to claim 1, characterized in that it includes a control input (E) for disconnecting the differential port, said control input connected to two field effect transistors (T6,T7) and operable for putting the differential port in the high impedance state.

7. Circuit according to claim 4, characterized in that it includes a diode (D$_1$) connected to one of said current generators (T4), for protecting the differential port from a positive overvoltage.

8. Circuit according to claim 4, characterized in that it includes means for adjusting the positive or negative voltage on the differential port, formed by an adjustable voltage source (+V$_{BB}$) and variable resistors (R12, R13) connected to said current generators (T4 and T5).

* * * * *